United States Patent [19]

Sakai et al.

[11] Patent Number: 5,373,039
[45] Date of Patent: Dec. 13, 1994

[54] RESIN COMPOSITIONS FOR LASER MARKING

[75] Inventors: Kenichi Sakai; Takuro Kitamura, both of Moka; Hideki Kato, Utsunomiya, all of Japan

[73] Assignee: General Electric Company, Pittsfield, Mass.

[21] Appl. No.: 66,797

[22] Filed: May 25, 1993

[30] Foreign Application Priority Data

May 29, 1992 [JP] Japan .................. 4-161468

[51] Int. Cl.$^5$ .......................... C08K 5/34; C08K 5/32; C08K 3/00
[52] U.S. Cl. ........................ 524/100; 524/173; 524/259; 524/424; 522/75; 522/78; 430/292; 430/298
[58] Field of Search ............... 430/292, 298; 522/75, 522/78; 524/100, 173, 259, 424

[56] References Cited

U.S. PATENT DOCUMENTS

| | | | |
|---|---|---|---|
| 4,032,691 | 6/1977 | Kido et al. | 428/304 |
| 4,241,166 | 12/1980 | Klupfel et al. | 430/292 |
| 4,629,679 | 12/1986 | Uchida et al. | 522/75 |
| 5,063,137 | 11/1991 | Kiyonari et al. | 430/292 |

*Primary Examiner*—Kriellion S. Morgan

[57] ABSTRACT

A resin composition suitable for marking with a laser and a method for laser marking said resin are provided. The resin composition comprises a thermoplastic resin, one or more compounds selected from the group consisting essentially of (i) tetrazole compounds, and (ii) sulfonylhydrazide, nitroso and azo compounds having a decomposition temperature of at least 210° C., and carbon black.

14 Claims, No Drawings

RESIN COMPOSITIONS FOR LASER MARKING

BACKGROUND OF THE INVENTION

Methods for marking thermoplastic resins include the spraying of ink by ink jet processes, screen printing, and ink writing. Problems with heat impact resistance (peeling of the ink surface), weatherability (discoloration of the ink) and wear resistance (wearing of the ink surface) are generally encountered with the use of these methods. In ink jet processes and screen printing, ink is applied to the resin surface and dried, thereby causing it to adhere; attention must be paid to this point in the selection of the ink. In ink embedding processes, either depressions are applied beforehand during molding in the resin marking places or engraving is carried out after molding; marking is then carried out by embedding ink or paint at those places. However, in methods where depressions are applied during molding, the marking shape is limited by the mold, making it difficult to change the marking shape for each product. Hence, in processes where engraving is carried out, a great deal of time is taken up with marking. In addition, because it is necessary that ink or paint be embedded afterward and the excess ink or paint removed, the steps become complicated, making such processes inappropriate for marking mass-produced products.

For the above reasons, much industrial use has been made recently of laser marking methods, which are non-contact, have a rapid marking speed, are automated, and enable easy process control. Laser marking methods are processes that use laser light to place marks, bar codes or images on the surface of metal, ceramic, macromolecular organic materials or the like.

Laser marking involves irradiation of the target surface with laser light. In a first type of laser marking process, marking is effected by utilizing changes in the surface state (toughening or forming depressions) brought about by erosion of the irradiated portion. In a second type of laser marking process, as described in Japanese Published Unexamined Patent Application [Kokai] Nos. 56-144,995 (1981), 60-155,493 (1985), 60-166,488 (1985), 60-172,590 (1985), 60-47,065 (1985), 62-50,360 (1987) and 3-10,884 (1991), marking is carried out by using the decoloration and discoloration of pigments and dyes in the irradiated portion. In a third type of laser marking process, as described in Japanese Examined Patent Application [Kokoku] No. 2-47,314 (1990), marking is carried out by using changes in the surface state (projections) due to foaming of the stock resin. Here, in laser marking process (3) that utilizes a change in state, unpolymerized monomers and decomposition products present in that portion of the resin to which intense heat has been applied by means of laser light are volatilized, causing those places to foam. Thus, marking is carried out to scatter and reflect light, and also to cause the resin to rise.

However, in marking by toughening or forming depressions in the surface (1), the boundary between the areas irradiated with laser light and the areas not irradiated is indistinct. There are cases where different types of resin are molded into a laminar structure and just the resin in the surface layer is removed. However, the production steps in this process become extremely complex, and there are problems over which layer erosion occurs down to. In the laser marking process (2) involving the decoloration or discoloration of pigments and dyes, the type and color of the resin is limited by the type of pigment or dye, which represents a drawback. Moreover, because the pigments and dyes are readily decolored or discolored by heat, the region of discoloration broadens and the contours of letters or the like become indistinct. In the laser marking process (3) that utilizes changes in state due to foaming, the optimal conditions for each resin must be investigated. Moreover, when one considers that a resin is not often used alone, in cases where the surface of a resin composition made of a plurality of ingredients is marked, the appropriate conditions in the various compositions must be carefully examined. Because some resins do not readily foam, there are limits on the resins that can be used.

Hence, the object act of this invention is to provide resin compositions to which distinct and secure markings can be easily applied in a short time.

SUMMARY OF THE INVENTION

The inventors discovered that when specific compounds are included in a thermoplastic resin, resin compositions are obtainable that can be distinctly marked by a very simple operation.

That is, the present invention is a resin composition for laser marking, comprising:

[A] a thermoplastic resin,

[B] one or more compounds selected from the group consisting of tetrazole compounds, and also sulfonylhydrazide compounds, nitroso compounds and azo compounds having a decomposition temperature of 210° C. or more, and

[C] carbon black.

There is no particular restriction on the thermoplastic resins used in the present invention, it being possible to use various known thermoplastic resins. These may be, but are not limited to, polyesters such as polyethylene terephthalate (PET), polybutylene terephthalate (PBT), polycyclohexene terephthalate (PCT), polyphenylene oxide (PPO), polycarbonate (PC), polyether imide (PEI), polystyrenes (PS) such as high-impact polystyrene (HIPS), polyethylene (PE), polypropylene (PP), polyamide (PA), polyvinyl chloride (PVC), polyacetal (POM), fluororesins such as polytetrafluoroethylene, acrylic resins, polysulfones, polyphenylenesulfides (PPS) and methylpentene resins. Alloys of various thermoplastic resins such as alloys of PPO and PS resins can be obtained. The use of polyester, PPO, PC, PEI or a resin alloy containing these is preferable.

An essential condition of this invention is that, secondly, one or more compounds selected from the group consisting of tetrazole compounds and also of azo compounds, nitroso compounds and sulfonylhydrazide compounds having a decomposition temperature of 210° C. or more be used. By including these compounds, it is possible to mark resins (compositions) that could not be marked by the method cited in Kokoku No. 2-47,314 (1990). Moreover, because there is no influence on areas not irradiated with laser light, these markings are very distinct. According to research conducted by the inventors, from the standpoint of foaming the laser irradiated areas, as indicated in Kokoku No. 2-47,314 (1990), if compounds that are commonly used as foaming agents, such as aliphatic hydrocarbons, their chlorinates or fluorinates, bicarbonates, or azo compounds, nitroso compounds or sulfonylhydrazide compounds having a decomposition temperature of less than about 210° C. are included, this has undesirable consequences, such as foaming during production of the resin composition or foaming even in regions not irradiated with laser light, making for indistinct marking. That is, only resin compositions according to this invention which contain the above compounds provide distinct marking by means of laser light irradiation. This was entirely unexpected.

Various known compounds can be used as the tetrazole compounds or as the azo compounds, nitroso compounds or sulfonylhydrazide compounds having a decomposition temperature of 210° C. or more (hereinafter, these compounds shall sometimes be referred to as "laser marking additives"). Preferable examples that may be cited include 1H-tetrazole compounds having substituents, such as tetrazole, 5,5'-bis-1H-tetrazole, 1-methyl-1H-tetrazole, 5-mercapto-1H-tetrazole, 1-methyl-5-mercapto-1H-tetrazole, 1-ethyl-5-mercapto-1H-tetrazole, 1-carboxymethyl-5-mercapto-1H-tetrazole, 1-cyclohexyl-5-mercapto-1H-hydrotetrazole, 1-phenyl-5-mercapto-1H-tetrazole, 1-(4-hydroxyphenyl)-5-mercapto-1H-tetrazole, 1-(3-acetamidophenyl)-5-mercapto-1H-tetrazole, 1-N,N-dimethylaminoethyl-5-mercapto-1H-tetrazole, 5-methyl-1H-tetrazole, 1,5-dimethyl-1H-tetrazole, 1-ethyl-5-methyl-1H-tetrazole, 1-methyl-5-(chloromethyl)-1H-tetrazole, 5-phenyl-1H-tetrazole, sodium 1H-tetrazole-5-carbonate, 1-ethyl-5-hydroxy-1H-tetrazole and 5-amino-1H-tetrazole; substituent-bearing 2H-tetrazole compounds of the same kind as above; and metal salts of these, such as the lithium, sodium, potassium, calcium, barium, magnesium, zinc, manganese and copper salts. However, the possibilities are not limited to these alone. Combinations of two or more of the above compounds can also be used. Preferable examples of these compounds are the alkaline earth metal salts of tetrazoles, and especially the calcium salt; the alkaline earth metal salts of 5-amino-1H-tetrazole, and especially the calcium salt; the alkaline earth metal salt of 5-methyl-1H-tetrazole, and especially the calcium and barium salts; and the alkaline earth metal salt of 5,5'-bis-1H-tetrazole, and especially the calcium salt. These compounds are preferably used in an amount of about 0.001-10 parts by weight, and even more preferably an amount of about 0.01-5 parts by weight, per 100 parts by weight of the thermoplastic resin.

A second essential condition of the present invention is the use of carbon black as an ingredient of the resin composition. By including carbon black together with the above compound, very distinct markings can be administered to the resin compositions. In this invention, the carbon black need only be made substantially of carbon, it being possible to use various known types of carbon black. Carbon black is generally produced by a furnace process, a contact process or an impact process. Examples that may be cited of the raw material include primarily creosote oil, heavy oil, ethylene bottoms, natural gas, acetylene gas, naphthalene, anthracene, petroleum, carbon dioxide and pitch oil. Depending on the method of production and the starting material, this is called variously furnace black, lamp black, thermal black, acetylene black, German furnace black, channel black, roller black, German naphthalene black, gas black and oil black. Examples that may be cited of commercial carbon blacks include FW18 made by Degussa, Inc., #45 made by Mitsubishi Kasei Corp., and #8500 made by Tokai Carbon Co. Two or more carbon blacks may be used. The carbon black should preferably be used in an amount of about 0.01-3 parts by weight, and most preferably 0.05-1.5 parts by weight, per 100 parts by weight of the thermoplastic resin.

The resin compositions for laser marking of the present invention can include any known substances. For example, these may contain rubber ingredients such as styrene-butadiene copolymers (SB), styrene-acrylonitrile copolymers (SAN), styrene-butadiene-styrene copolymers (SBS), styrene-ethylene-butadiene-styrene copolymers (SEBS), ethylene-propylene copolymers (EP), ethylene-propylene-diene copolymers (EPDM) and acrylonitrile-butadiene-styrene copolymers (ABS).

The resin compositions for laser marking according to the present invention can also contain various flame retardants and flame-retarding adjuvants. There is no particular restriction on the flame retardants and flame-retarding adjuvant. Preferable examples that may be cited include halogen-based flame retardants such as brominated imides, brominated polycarbonates, brominated epoxy compounds, brominated bisphenol A (Br-BPA) and brominated polyphenylene oxide; phosphorus-based flame retardants such as triphenylphosphates (TPP), and flame-retarding adjuvants such as $Sb_2O_3$, although the possibilities are not limited to these alone. The amount in which these flame retardants and flame-retarding adjuvants are used may be set as desired in accordance with the type of thermoplastic resin and the desired resin composition, but it is generally preferable to set the amount of flame retardant at about 5-30 parts by weight and the amount of flame-retarding adjuvant at about 0-15 parts by weight, per 100 parts by weight of the thermoplastic resin.

In addition, reinforcing agents such as glass fibers, carbon fibers and aramid fibers may be contained in the resin compositions for laser marking according to the present invention. The amounts in which these are used may be set as desired in accordance with the type of thermoplastic resin and the desired resin composition, but it is generally desirable for this to be set at about 0-100 parts by weight, and especially about 0-50 parts by weight, per 100 parts by weight of thermoplastic resin.

One or more components of any type other than those cited above may also be contained within the resin compositions of this invention within a range that does not interfere with the object of this invention, Examples include inorganic or organic fillers such as glass, silica and talc, as well as conventional additives such as plasticizers, lubricants, heat stabilizers, weather stabilizers, antistatic agents, slip agents, anti-blocking agents, antifogging agents, pigments, dyes, natural oils, synthetic oils and waxes.

The resin compositions for laser marking of the present invention can be obtained by mixing together all of the above ingredients. There is no particular restriction on the mixing method, it being possible to adopt any sequence for compounding the various ingredients. For example, marking additives, carbon black and any other ingredients may be added to a thermoplastic resin in the molten state and mixed, or marking additives, carbon black and any other ingredients may be added to a solution of the thermoplastic resin and kneaded. Specific methods that may be cited include a method whereby the marking additives, carbon black and any other ingredients are separately or simultaneously added directly to a thermoplastic resin in the molten state, following which kneading is carried out; a method whereby pellets of a thermoplastic resin are fed together with marking additives, carbon black and any other ingredients to a single-screw or twin-screw extruder, and melt-kneading is carried out; and a method whereby a thermoplastic resin is dissolved in a suitable solvent (e.g., methylene chloride, chloroform, toluene, tetrahydrofuran), marking additives, carbon black and any other ingredients are added separately or simultaneously to this solution, and kneading is carried out. Of these methods, one preferable form of the melt kneading method consists of carrying out extrusion with a single-screw or twin-screw extruder (D=30–90 mm) at a temperature appropriate for the thermoplastic resin being used (for example the temperature may be set at about 260° C. in the case of PBT resins, about 280° C. in the case of PCT resins, about 280° C. in the case of mixtures of PPO resins and PS resins, about 270° C. in the case of PC resins, and about 330° C. in the case of PEI resins, although it is not limited to these), thereby giving resin compositions according to the present invention in the form of pellets. There is no particular restriction on the method for producing molded pieces from resin compositions according to the present invention. Various known methods such as injection molding, extrusion, blow molding and vacuum molding may be used. Nor is there any particular restriction on the molding conditions, it being possible to mold under any temperature and pressure conditions that are appropriate for the ingredients being used, the intended molded pieces and the molding process (in the case of temperature, this can be set at about 260° C. for the injection molding of PBT resins, about 280° C. for the injection molding of PCT resins, about 260° C. for the injection molding of mixtures of PPO resin and PS resin, about 270° C. for the injection molding PC resin, and about 320° C. for injection molding PEI resins, although the temperature is not limited to these). The selection of a suitable kneading method and a suitable molding method appropriate for the ingredients and the intended object should be a simple matter to those conversant with the art.

Laser marking can be carried out by any technique on the resin compositions of the present invention. For example, a carbon dioxide gas laser or a YAG laser can be used, although the possibilities are not limited to these alone. Distinct marking can be carried out by irradiating laser light onto the resin compositions of the present invention. In marking onto the resin compositions of the present invention, unlike marking that involves decoloring or discoloring dyes or pigments, the laser light does not have an effect on areas other than the irradiated areas. Hence, it is possible, for example, to draw e fine line having a width of about 10 um. In addition, marking can be rapidly carried out; for instance, if this is a line having a width of about 1.0 mm, writing can be carried out at a speed of 200 mm/sec or more. This invention encompasses resin compositions of various formulations, but it is not necessary to carefully investigate the optimal irradiation conditions for each composition; nor is there any restriction on the resins used as the ingredients. A further advantage of the resin compositions according to the present invention is that the production steps can be simplified.

The reason why the resin compositions of the present invention are distinctly marked by laser light is not clear, but it is thought that the marking additives and/or carbon black within the resin compositions in the portion irradiated with laser light deteriorate or that the resin composition in that portion form projections and depressions, giving rise to the scattering and reflection of light.

The present invention shall now be illustrated more concretely by means of the examples presented below, although it shall be understood that these examples in no way restrict the scope of the invention.

DETAILED DESCRIPTION OF THE PREFERRED EMBODIMENTS

The ingredients shown in Tables 1–9 were selected from the following ingredients, and pellets were prepared by extrusion using an extruder. Molded pieces measuring 50×50×3mm were injection-molded using these pellets. The temperature during extrusion and the temperature at the time of injection molding are indicated in Tables 1–5 [sic].

A) Resins: 100 parts by weight of any one of the following:
- A-a) PBT (Valox TM, made by GE Plastics Japan)
- A-b) PCT (Valox TM, made by GE Plastics Japan)
- A-c) Mixture of PPO and PS resins (Noryl TM, made by GE Plastics Japan)
- A-d) PC (Lexan TM, made by GE Plastics Japan)
- A-e) PEI (Ultem TM, made by GE Plastics Japan).

B) Laser marking additives: 0.5 part by weight of one of the following:
- B-a) the calcium salt of 5,5'-bis-1H-tetrazole
- B-b) the calcium salt of tetrazole
- B-c) the calcium salt of 5-methyl-1H-tetrazole
- B-d) the barium salt of 5-methyl-1H-tetrazole
- B-e) the calcium salt of 5,5'-bis-1H-tetrazole C) Carbon black (FW18 TM, made by Degussa, Inc.), used in the amounts (parts by weight) indicated in Tables 1–9.

D) Flame Retardants: Any one of the following:
- D-a) 15 parts by weight of brominated imides (BT-93 TM, made by Ethyl Corporation)
- D-b) 15 parts by weight of brominated PC (ML4365 TM, made by GE Plastics Japan)
- D-c) 15 parts by weight of brominated PS (Pyrocheck TM, made by Ferro Kagaku)
- D-d) 15 parts by weight of brominated epoxy compounds (SR-T5000 TM, made by Sakamoto Yakuhin)
- D-e) 15 parts by weight of brominated BPA oligomer (FR-53 TM, made by Mitsubishi Gas)
- D-f) mixture of 12 parts by weight of a brominated BPA oligomer (FR-53) and 5 parts by weight of $Sb_2O_3$
- D-g) 12 parts by weight of TPP E) Glass fibers, used in the amounts (parts by weight) indicated in Tables 1–9.

Marking was carried out on the surface of these molded pieces using a $CO_2$ gas laser or a YAG laser. The marking conditions were as follows:

$CO_2$ gas laser: 6–24 J/cm$^2$

YAG laser: moving speed, 100–400 mm/s byte size, 10–140 μm

The marking clarity was evaluated visually, and assigned a grade of A-E, where A indicated a very distinct marking, C is a distinct marking, and E is a very indistinct marking. Those results are shown in Tables 1–9.

TABLE 1

| | Composition | | | | | Results | |
|---|---|---|---|---|---|---|---|
| Ex. | A) | B) | C) | D) | E) | CO$_2$ | YAG |
| 1 | A-a) | — | — | — | — | E | D |

TABLE 1-continued

| Ex. | Composition A) | B) | C) | D) | E) | Results CO$_2$ | YAG |
|---|---|---|---|---|---|---|---|
| 2 | A-a) | — | 0.1 | — | — | C | C |
| 3 | A-a) | — | 1 | — | — | C | C |
| 4 | A-a) | — | 5 | — | — | E | D |
| 5 | A-a) | B-a) | — | — | — | B | B |
| 6 | A-a) | B-a) | 0.1 | — | — | A | A |
| 7 | A-a) | B-b) | — | — | — | B | B |
| 8 | A-a) | B-b) | 0.1 | — | — | A | A |
| 9 | A-a) | B-c) | — | — | — | B | B |
| 10 | A-a) | B-c) | 0.1 | — | — | A | A |
| 11 | A-a) | B-d) | — | — | — | B | B |
| 12 | A-a) | B-d) | 0.1 | — | — | A | A |
| 13 | A-a) | B-e) | — | — | — | B | B |
| 14 | A-a) | B-e) | 0.1 | — | — | A | A |
| 15 | A-a) | — | — | D-a) | 30 | E | E |
| 16 | A-a) | B-a) | — | D-a) | 30 | C | B |
| 17 | A-a) | B-a) | 0.1 | D-a) | 30 | A | A |
| 18 | A-a) | B-b) | — | D-a) | 30 | C | B |
| 19 | A-a) | B-b) | 0.1 | D-a) | 30 | A | A |
| 20 | A-a) | B-c) | — | D-a) | 30 | C | B |
| 21 | A-a) | B-c) | 0.1 | D-a) | 30 | A | A |
| 22 | A-a) | B-d) | — | D-a) | 30 | C | B |
| 23 | A-a) | B-d) | 0.1 | D-a) | 30 | A | A |
| 24 | A-a) | B-e) | — | D-a) | 30 | C | B |
| 25 | A-a) | B-e) | 0.1 | D-a) | 30 | A | A |

TABLE 2

| Ex. | Composition A) | B) | C) | D) | E) | Results CO$_2$ | YAG |
|---|---|---|---|---|---|---|---|
| 26 | A-a) | — | — | D-b) | 30 | E | E |
| 27 | A-a) | B-a) | — | D-b) | 30 | C | B |
| 28 | A-a) | B-a) | 0.1 | D-b) | 30 | A | A |
| 29 | A-a) | B-b) | — | D-b) | 30 | C | B |
| 30 | A-a) | B-b) | 0.1 | D-b) | 30 | A | A |
| 31 | A-a) | B-c) | — | D-b) | 30 | C | B |
| 32 | A-a) | B-c) | 0.1 | D-b) | 30 | A | A |
| 33 | A-a) | B-d) | — | D-b) | 30 | C | B |
| 34 | A-a) | B-d) | 0.1 | D-b) | 30 | A | A |
| 35 | A-a) | B-e) | — | D-b) | 30 | C | B |
| 36 | A-a) | B-e) | 0.1 | D-b) | 30 | A | A |
| 37 | A-a) | — | — | D-c) | 30 | E | E |
| 38 | A-a) | B-a) | — | D-c) | 30 | C | B |
| 39 | A-a) | B-a) | 0.1 | D-c) | 30 | A | A |
| 40 | A-a) | B-b) | — | D-c) | 30 | C | B |
| 41 | A-a) | B-b) | 0.1 | D-c) | 30 | B | A |
| 42 | A-a) | B-c) | — | D-c) | 30 | C | B |
| 43 | A-a) | B-c) | 0.1 | D-c) | 30 | A | A |
| 44 | A-a) | B-d) | — | D-c) | 30 | C | B |
| 45 | A-a) | B-d) | 0.1 | D-c) | 30 | B | A |
| 46 | A-a) | B-e) | — | D-c) | 30 | C | B |
| 47 | A-a) | B-e) | 0.1 | D-c) | 30 | A | A |

TABLE 3

| Ex. | Composition A) | B) | C) | D) | E) | Results CO$_2$ | YAG |
|---|---|---|---|---|---|---|---|
| 48 | A-a) | — | — | D-d) | 30 | E | E |
| 49 | A-a) | B-a) | — | D-d) | 30 | C | B |
| 50 | A-a) | B-a) | 0.1 | D-d) | 30 | A | A |
| 51 | A-a) | B-b) | — | D-d) | 30 | C | B |
| 52 | A-a) | B-b) | 0.1 | D-d) | 30 | A | A |
| 53 | A-a) | B-c) | — | D-d) | 30 | C | B |
| 54 | A-a) | B-c) | 0.1 | D-d) | 30 | A | A |
| 55 | A-a) | B-d) | — | D-d) | 30 | C | B |
| 56 | A-a) | B-d) | 0.1 | D-d) | 30 | A | A |
| 57 | A-a) | B-e) | — | D-d) | 30 | C | B |
| 58 | A-a) | B-e) | 0.1 | D-d) | 30 | A | A |
| 59 | A-a) | — | — | D-e) | 30 | E | E |
| 60 | A-a) | B-a) | — | D-e) | 30 | C | B |
| 61 | A-a) | B-a) | 0.1 | D-e) | 30 | A | A |
| 62 | A-a) | B-b) | — | D-e) | 30 | C | B |
| 63 | A-a) | B-b) | 0.1 | D-e) | 30 | A | A |
| 64 | A-a) | B-c) | — | D-e) | 30 | C | B |
| 65 | A-a) | B-c) | 0.1 | D-e) | 30 | A | A |
| 66 | A-a) | B-d) | — | D-e) | 30 | C | B |
| 67 | A-a) | B-d) | 0.1 | D-e) | 30 | A | A |

TABLE 3-continued

| Ex. | Composition A) | B) | C) | D) | E) | Results CO$_2$ | YAG |
|---|---|---|---|---|---|---|---|
| 68 | A-a) | B-e) | — | D-e) | 30 | C | B |
| 69 | A-a) | B-e) | 0.1 | D-e) | 30 | A | A |

TABLE 4

| Ex. | Composition A) | B) | C) | D) | E) | Results CO$_2$ | YAG |
|---|---|---|---|---|---|---|---|
| 70 | A-a) | — | — | D-f) | 30 | E | E |
| 71 | A-a) | B-a) | — | D-f) | 30 | C | B |
| 72 | A-a) | B-a) | 0.1 | D-f) | 30 | B | A |
| 73 | A-a) | B-b) | — | D-f) | 30 | C | B |
| 74 | A-a) | B-b) | 0.1 | D-f) | 30 | B | A |
| 75 | A-a) | B-c) | — | D-f) | 30 | C | B |
| 76 | A-a) | B-c) | 0.1 | D-f) | 30 | A | A |
| 77 | A-a) | B-d) | — | D-f) | 30 | C | B |
| 78 | A-a) | B-d) | 0.1 | D-f) | 30 | B | A |
| 79 | A-a) | B-e) | — | D-f) | 30 | C | B |
| 80 | A-a) | B-e) | 0.1 | D-f) | 30 | A | A |

TABLE 5

| Ex. | Composition A) | B) | C) | D) | E) | Results CO$_2$ | YAG |
|---|---|---|---|---|---|---|---|
| 81 | A-b) | — | — | — | — | E | E |
| 82 | A-b) | — | 0.1 | — | — | C | C |
| 83 | A-b) | — | 1 | — | — | C | C |
| 84 | A-b) | — | 5 | — | — | E | D |
| 85 | A-b) | B-a) | — | — | — | B | B |
| 86 | A-b) | B-a) | 0.1 | — | — | A | A |
| 87 | A-b) | B-b) | — | — | — | B | B |
| 88 | A-b) | B-b) | 0.1 | — | — | A | A |
| 89 | A-b) | B-c) | — | — | — | B | B |
| 90 | A-b) | B-c) | 0.1 | — | — | A | A |
| 91 | A-b) | B-d) | — | — | — | B | B |
| 92 | A-b) | B-d) | 0.1 | — | — | A | A |
| 93 | A-b) | B-e) | — | — | — | B | B |
| 94 | A-b) | B-e) | 0.1 | — | — | A | A |
| 95 | A-b) | — | — | D-c) | 30 | E | E |
| 96 | A-b) | B-a) | — | D-c) | 30 | C | B |
| 97 | A-b) | B-a) | 0.1 | D-c) | 30 | B | A |
| 98 | A-b) | B-b) | — | D-c) | 30 | C | B |
| 99 | A-b) | B-b) | 0.1 | D-c) | 30 | B | A |
| 100 | A-b) | B-c) | — | D-c) | 30 | C | B |
| 101 | A-b) | B-c) | 0.1 | D-c) | 30 | A | A |
| 102 | A-b) | B-d) | — | D-c) | 30 | C | B |
| 103 | A-b) | B-d) | 0.1 | D-c) | 30 | B | A |
| 104 | A-b) | B-e) | — | D-c) | 30 | C | B |
| 105 | A-b) | B-e) | 0.1 | D-c) | 30 | A | A |

TABLE 6

| Ex. | Composition A) | B) | C) | D) | Results CO$_2$ | YAG |
|---|---|---|---|---|---|---|
| 106 | A-c) | — | — | — | D | C |
| 107 | A-c) | — | 0.1 | — | C | C |
| 108 | A-c) | — | 1 | — | C | C |
| 109 | A-c) | — | 5 | — | D | D |
| 110 | A-c) | B-a) | — | — | B | B |
| 111 | A-c) | B-a) | 0.1 | — | A | A |
| 112 | A-c) | B-b) | — | — | B | B |
| 113 | A-c) | B-b) | 0.1 | — | A | A |
| 114 | A-c) | B-c) | — | — | B | B |
| 115 | A-c) | B-c) | 0.1 | — | A | A |
| 116 | A-c) | B-d) | — | — | B | B |
| 117 | A-c) | B-d) | 0.1 | — | A | A |
| 118 | A-c) | B-e) | — | — | B | B |
| 119 | A-c) | B-e) | 0.1 | — | A | A |
| 120 | A-c) | — | — | D-g) | E | E |
| 121 | A-c) | B-a) | — | D-g) | C | B |
| 122 | A-c) | B-a) | 0.1 | D-g) | B | A |
| 123 | A-c) | B-b) | — | D-g) | C | B |
| 124 | A-c) | B-b) | 0.1 | D-g) | B | A |
| 125 | A-c) | B-c) | — | D-g) | C | B |
| 126 | A-c) | B-c) | 0.1 | D-g) | B | A |

TABLE 6-continued

| Ex. | Composition A) | B) | C) | D) | Results CO2 | YAG |
|---|---|---|---|---|---|---|
| 127 | A-c) | B-d) | — | D-g) | C | B |
| 128 | A-c) | B-d) | 0.1 | D-g) | B | A |
| 129 | A-c) | B-e) | — | D-g) | C | B |
| 130 | A-c) | B-e) | 0.1 | D-g) | A | A |

TABLE 7

| Ex. | Composition A) | B) | C) | D) | Results CO2 | YAG |
|---|---|---|---|---|---|---|
| 131 | A-d) | — | — | — | D | C |
| 132 | A-d) | — | 0.1 | — | C | C |
| 133 | A-d) | — | 1 | — | C | C |
| 134 | A-d) | — | 5 | — | D | C |
| 135 | A-d) | B-a) | — | — | B | B |
| 136 | A-d) | B-a) | 0.1 | — | A | A |
| 137 | A-d) | B-b) | — | — | B | B |
| 138 | A-d) | B-b) | 0.1 | — | A | A |
| 139 | A-d) | B-c) | — | — | B | B |
| 140 | A-d) | B-c) | 0.1 | — | A | A |
| 141 | A-d) | B-d) | — | — | B | B |
| 142 | A-d) | B-d) | 0.1 | — | A | A |
| 143 | A-d) | B-e) | — | — | B | B |
| 144 | A-d) | B-e) | 0.1 | — | A | A |
| 145 | A-d) | — | — | D-d) | D | D |
| 146 | A-d) | B-a) | — | D-d) | C | B |
| 147 | A-d) | B-a) | 0.1 | D-d) | A | A |
| 148 | A-d) | B-b) | — | D-d) | C | B |
| 149 | A-d) | B-b) | 0.1 | D-d) | A | A |
| 150 | A-d) | B-c) | — | D-d) | C | B |
| 151 | A-d) | B-c) | 0.1 | D-d) | A | A |
| 152 | A-d) | B-d) | — | D-d) | C | B |
| 153 | A-d) | B-d) | 0.1 | D-d) | A | A |
| 154 | A-d) | B-e) | — | D-d) | C | B |
| 155 | A-d) | B-e) | 0.1 | D-d) | A | A |

TABLE 8

| Ex. | Composition A) | B) | C) | D) | Results CO2 | YAG |
|---|---|---|---|---|---|---|
| 156 | A-d) | — | — | D-e) | D | D |
| 157 | A-d) | B-a) | — | D-e) | C | B |
| 158 | A-d) | B-a) | 0.1 | D-e) | A | A |
| 159 | A-d) | B-b) | — | D-e) | C | B |
| 160 | A-d) | B-b) | 0.1 | D-e) | A | A |
| 161 | A-d) | B-c) | — | D-e) | C | B |
| 162 | A-d) | B-c) | 0.1 | D-e) | A | A |
| 163 | A-d) | B-d) | — | D-e) | C | B |
| 164 | A-d) | B-d) | 0.1 | D-e) | A | A |
| 165 | A-d) | B-e) | — | D-e) | C | B |
| 166 | A-d) | B-e) | 0.1 | D-e) | A | A |

TABLE 9

| Ex. | Composition A) | B) | C) | D) | Results CO2 | YAG |
|---|---|---|---|---|---|---|
| 167 | A-e) | — | — | — | E | D |
| 168 | A-e) | — | 0.1 | — | C | C |
| 169 | A-e) | — | 1 | — | C | C |
| 170 | A-e) | — | 5 | — | E | D |
| 171 | A-e) | B-a) | — | — | C | C |
| 172 | A-e) | B-a) | 0.1 | — | B | A |
| 173 | A-e) | B-b) | — | — | C | C |
| 174 | A-e) | B-b) | 0.1 | — | B | B |
| 175 | A-e) | B-c) | — | — | C | C |
| 176 | A-e) | B-c) | 0.1 | — | A | A |
| 177 | A-e) | B-d) | — | — | C | C |
| 178 | A-e) | B-d) | 0.1 | — | B | B |
| 179 | A-e) | B-e) | — | — | C | C |
| 180 | A-e) | B-e) | 0.1 | — | A | A |

From the above description, it is apparent that, according to the present invention, compositions which contain laser marking additives and carbon black form more distinct marks by means of laser light irradiation than in the case of compositions containing just one or neither of these.

Using resin compositions containing azodicarbonamide (ADCA) or N,N'-dinitrosopentamethylene tetramine (DPT), which are conventional blowing agents, the production of molded pieces by means of the same molding operations as in Examples 1, 15, 26, 37, 48, 59, 70, 81, 95, 106, 120, 131, 145, 156 or 167 was attempted, but ell of these foamed during extrusion of the resin composition.

Distinct and secure marking can be carried out on the resin compositions of the present invention by means of laser irradiation. In the resin compositions of the present invention, the laser light does not have an effect on non-irradiated areas. For this reason, it is also possible to draw a fine line having a linewidth of about 10 μm. Resin compositions of various formulations are encompassed within the present invention, but there is no need to closely investigate the optimal conditions for the various compositions. Another advantage of the resin compositions according to this invention is that the production steps are simplified.

What is claimed is:

1. A resin composition for laser marking, comprising:
   [A] a thermoplastic resin.
   [B] one or more compounds selected from the group consisting essentially of tetrazole compounds, and also sulfonylhydrazide compounds, nitroso compounds and azo compounds having a decomposition temperature of 210° C. or more, and
   [C] carbon black.

2. A resin composition for laser marking according to claim 1, which composition contains also a flame-retarding agent.

3. A resin composition comprising
   (A) a thermoplastic resin; and
   (B) one or more compounds selected from the group consisting essentially of
      (i) tetrazole compounds,
      (ii) sulfonylhydrazide, nitroso and azo compounds having a decomposition temperature of 210° C. or more, and
   (C) carbon black.

4. A resin composition according to claim 3, wherein said thermoplastic resin is selected from the group consisting essentially of polyethylene terephthalate, polybutylene terephthalate, polycyclohexane terephthalate, polyphenylene oxide, polycarbonate, polyether imide, polystyrene, polyethylene, polypropylene, polyamide, polyvinyl chloride, polyacetal, fluororesins, acrylic resins, polysulfones, polyphenylene sulfides, methylpentene resins, and mixtures thereof.

5. A resin composition according to claim 3, wherein said tetrazole compound is selected from the group consisting essentially of substituted 1H-tetrazole compounds, substituted 2H-tetrazole compounds, and the metal salts of said substituted compounds.

6. A resin composition according to claim 5 wherein said tetrazole compound is selected from the group consisting essentially of the calcium salt of tetrazole, the calcium salt of 5-amino-1H-tetrazole, the calcium and barium salts of 5-methyl-1H-tetrazole, and the calcium salt of 5,5'-bis-1H-tetrazole.

7. A resin composition according to claim 5 wherein said tetrazole compound comprises from about 0.001 to about 10 parts by weight per 100 parts by weight of the thermoplastic resin.

8. A resin composition according to claim 3 further comprising a flame retardant.

9. A resin composition according to claim 8, wherein said flame retardant is selected from the consisting essentially of brominated imides, brominated polycarbonates, brominated epoxy compounds, brominated bisphenol A compounds, brominated polyphenylene oxides, triphenylphosphates and $Sb_2O_3$.

10. A resin composition according to claim 3 further comprising a reinforcing agent.

11. A resin composition according to claim 10 wherein said reinforcing agent is selected from the group consisting essentially of glass fibers, carbon fibers and aramid fibers.

12. A resin composition according to claim 10 wherein said reinforcing agent comprises 0 to 100 parts by weight per 100 parts by weight of the thermoplastic resin.

13. A method of marking a resin composition the steps of preparing a resin composition of
 (A) a thermoplastic resin,
 (B) one or more compounds selected from the group consisting essentially of
  (i) tetrazole compounds, and
  (ii) sulfonylhydrazide, nitroso and azo compounds having a decomposition temperature of 210° C. or more, and
 (C) carbon black, and irradiating at least a portion of a surface of the resin composition with a laser.

14. A method according to claim 13 wherein said laser is selected from the group consisting essentially of $CO_2$ lasers and YAG lasers.

* * * * *